Aug. 4, 1953  A. V. MOFFITT  2,647,759
ATTACHMENT FOR CONVERTING SLEDS TO WHEELED VEHICLES
Filed Feb. 14, 1952  3 Sheets-Sheet 1
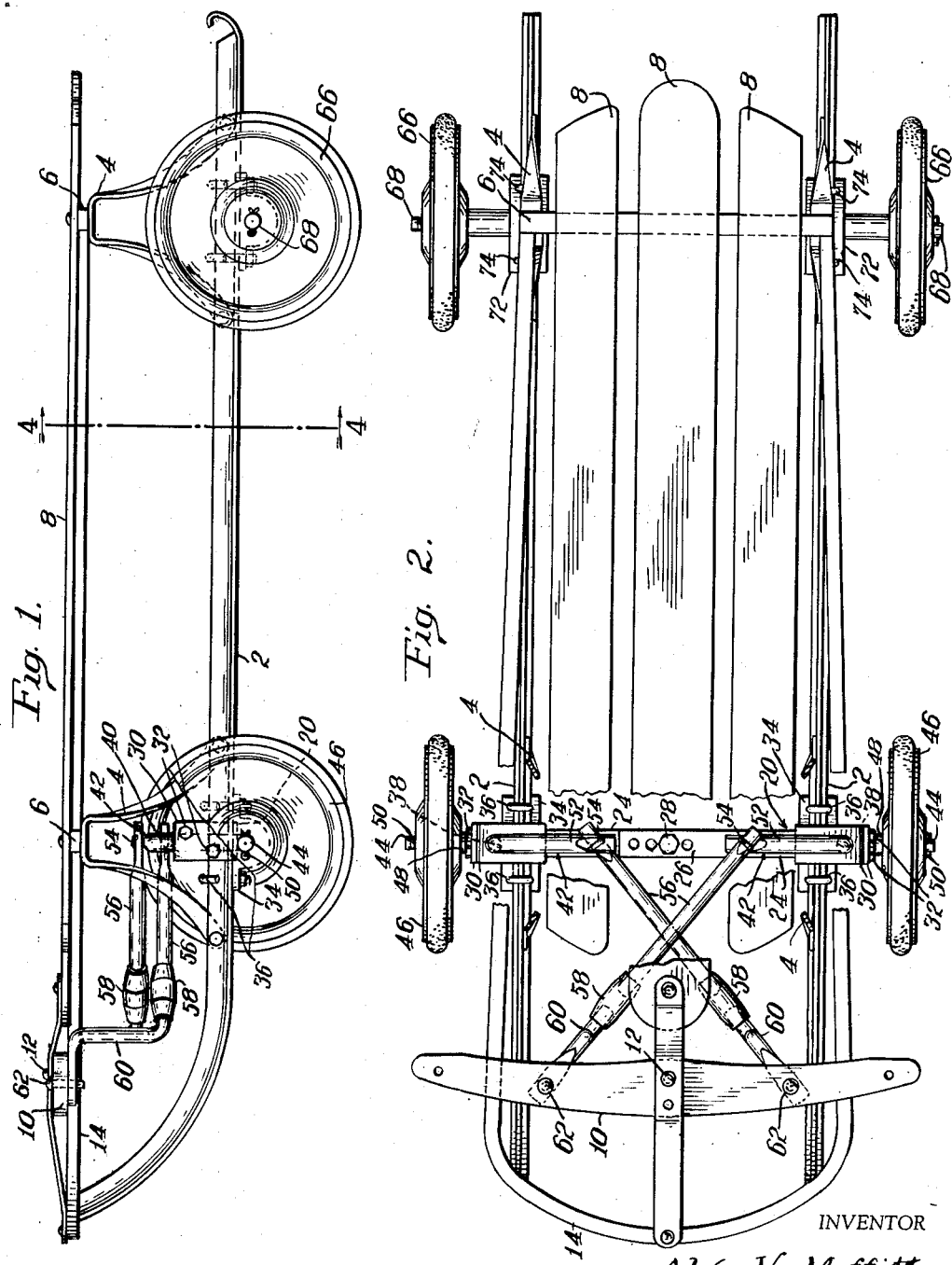
INVENTOR
Alva V. Moffitt
BY Fisher & Christen,
ATTORNEYS

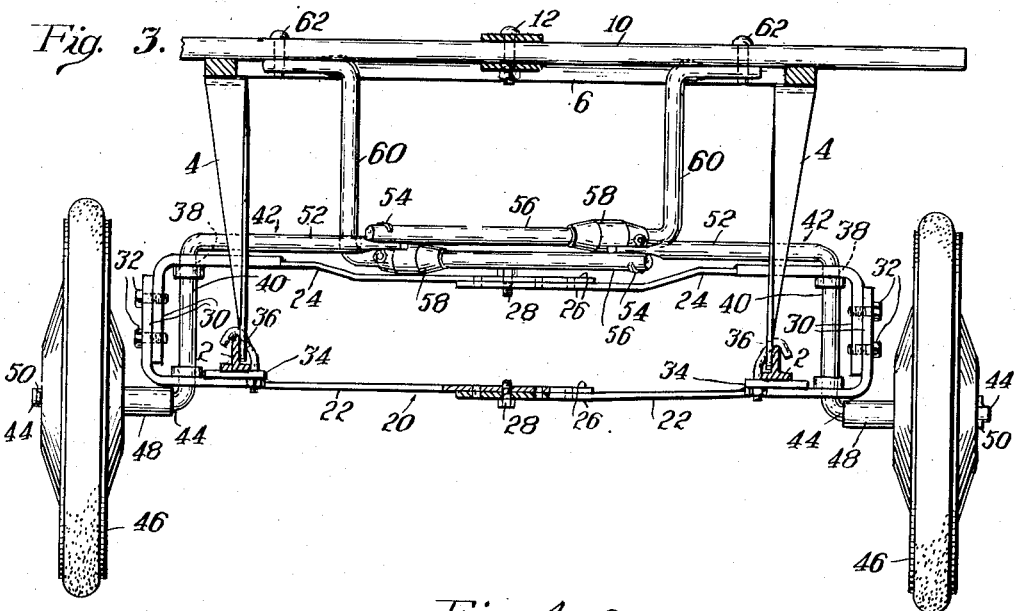
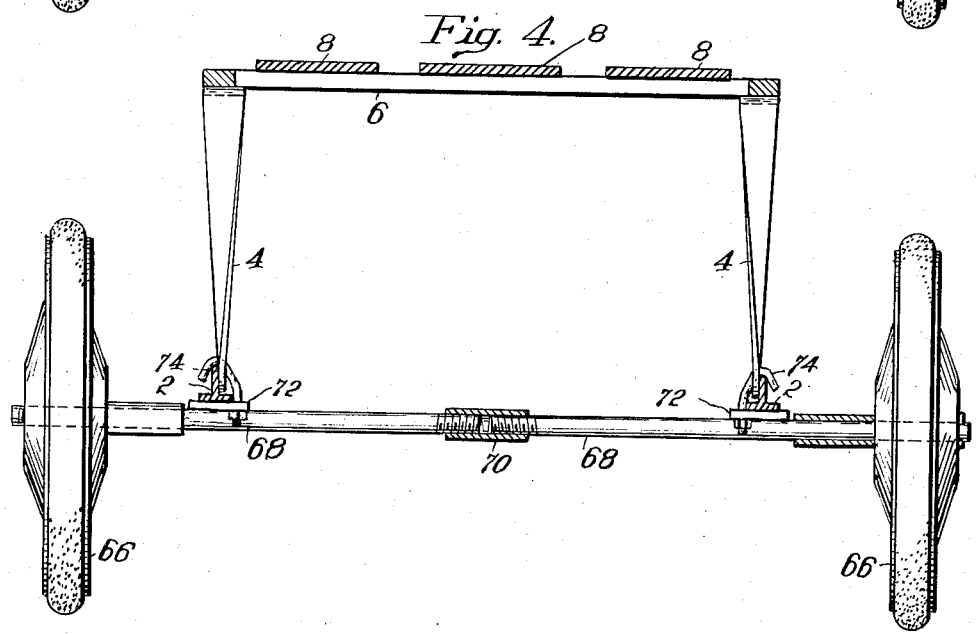

Aug. 4, 1953 A. V. MOFFITT 2,647,759
ATTACHMENT FOR CONVERTING SLEDS TO WHEELED VEHICLES
Filed Feb. 14, 1952 3 Sheets-Sheet 3

INVENTOR
Alva V. Moffitt

BY *Fisher & Christen,*
ATTORNEYS

Patented Aug. 4, 1953

2,647,759

UNITED STATES PATENT OFFICE 2,647,759

ATTACHMENT FOR CONVERTING SLEDS TO WHEELED VEHICLES

Alva V. Moffitt, Arkansas City, Kans.

Application February 14, 1952, Serial No. 271,475

3 Claims. (Cl. 280—8)

1

This invention is an attachment for use with a sled for converting the sled into a wheeled vehicle or small express wagon, so that the usefulness of the sled is not limited to the winter months.

The principal object of the invention is to provide an attachment for a sled, which can be applied to sleds of different widths, and which provides steerable front wheels, which can be controlled either by the person on the sled, or by a person pulling the sled.

More particularly, the attachment of this invention comprises wheeled transversely extending frames, which are variable in length for attachment to sled runners spaced different distances apart. The front frame for the front wheels comprises preferably two horizontally extending, superposed web members rigidly connected at their outer ends to form a substantially rectangular frame. This frame is made in two parts, which may be variably positioned with respect to each other, for adjustment to sleds of different widths. The upper and lower webs, near their outer ends are each provided with a pair of vertically aligned bearings, preferably a pair of vertically aligned holes. Mounted to pivot in each pair of bearings is the vertical portion of an axle rod. This axle rod, in addition to this vertical portion, comprises a horizontally extending axle, preferably integral therewith, at its lower end, and a horizontally extending control arm, preferably integral therewith, at its upper end. These control arms are connected to control rods, which are in turn connected to a steering bar on the sled and are variable in length, so as to fit sleds of different sizes.

Further advantages of structure and operation will be explained in connection with the accompanying drawings, illustrating the present preferred embodiment of the invention.

In these drawings:

Figure 1 is a side elevation of a sled having the attachment of the present invention applied thereto.

Figure 2 is a top view of Figure 1, part of the top of the sled being broken away.

Figure 3 is a front view of Figure 1, looking from the left, for an enlarged scale.

Figure 4 is a section on line 4—4 of Figure 1, looking in the direction of the arrows.

2

Figure 5:
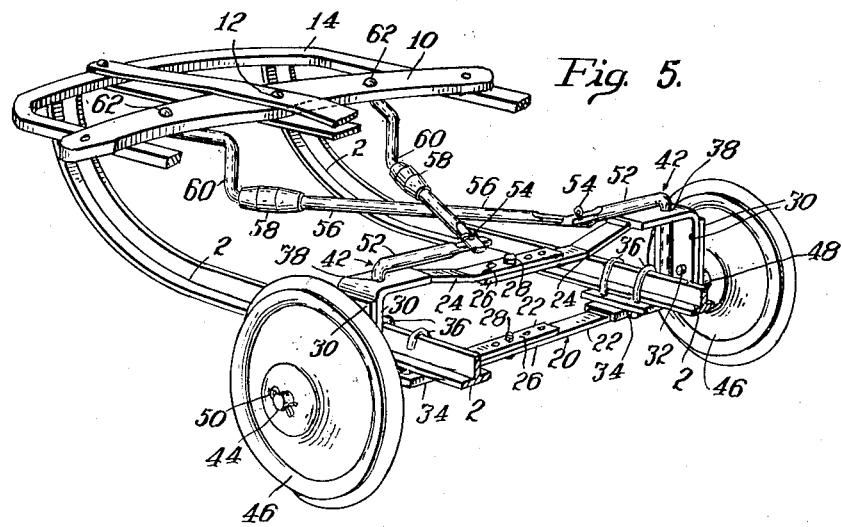
Figure 5 is a perspective view of the attachment for the front of the sled.

Referring now to the drawings, a typical sled is shown, comprising the usual runners 2, to which are secured brackets 4 for supporting cross bars 6 and floor boards 8. The sled also has the usual steering bar 10, secured by rivets or bolts 12 to a bar 14 for transmitting movement of the steering bar to the curved member 14, to the underside of which are connected the flexible forward ends of the runners 2.

Referring particularly to Figure 5, the attachment comprises a substantially rectangular frame, indicated generally at 20, composed of lower webs 22, and upper webs 24. The midportions of those webs overlap and are provided with spaced bars 26, so that they are variably positionable, as by bolts 28, for varying the effective length of frames 20. The ends of the webs are provided with upwardly and downwardly bent ends 30, held together by bolts 32.

The frame 20 is provided with any convenient means for detachably securing it to the sled runners, such as small plates 34, welded thereto, carrying hook bolts 36 that hook over the runners 2.

The webs 22 and 24 are provided with vertically aligned holes as at 38, for forming vertically aligned bearings for the vertical portions 40, Figure 3, of a pair of control arms, indicated generally at 42. These control arms each has a horizontally extending axle 44, secured thereto and preferably integral therewith, on which are mounted wheels 46, the axle having spacer sleeves 48 thereon, cotter pins or nuts 50 holding the wheels in place.

Figure 7:
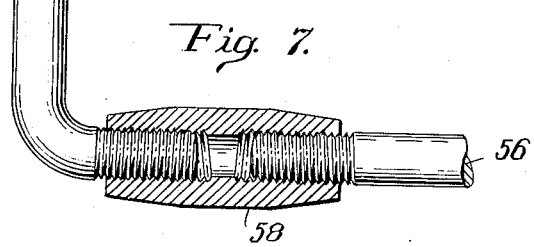
Figure 7 is a vertical sectional view of a coupling.

The control arms 42 also have upper horizontally extending portions 52, Figure 3. In assembling, the upper and lower webs are threaded over 52, and then the bolts 32 are applied. The portions 52 are pivotally secured at their inner ends, as at 54, to the ends of diagonally extending control rods 56. Control rods 56 are respectively connected by threaded coupling 58 to connectors 60, upwardly offset for attachment to the usual steering bar 10 of the sled, as at 62. The coupling 58, Figure 7, is interiorly and reversely threaded, for convenient assembly, and for providing the proper setting for rods 56 with relation to the wheels 46.

In operation, the frame 42 is fitted to the runners, and bolts 28 applied to bring the frame to the proper size to fit the runners, and hook bolts 36 tightened. For occupant steering, the steering bar 10 is twisted to the right or left, the connectors 60 actuate the diagonal rods 56, which turn the control arms 42 about vertical axes 38 and so turn the axles 44 and wheels 46 to the right or left. One of the two usual bolts 12 is preferably removed, to allow steering bar to move more readily.

Figure 6:
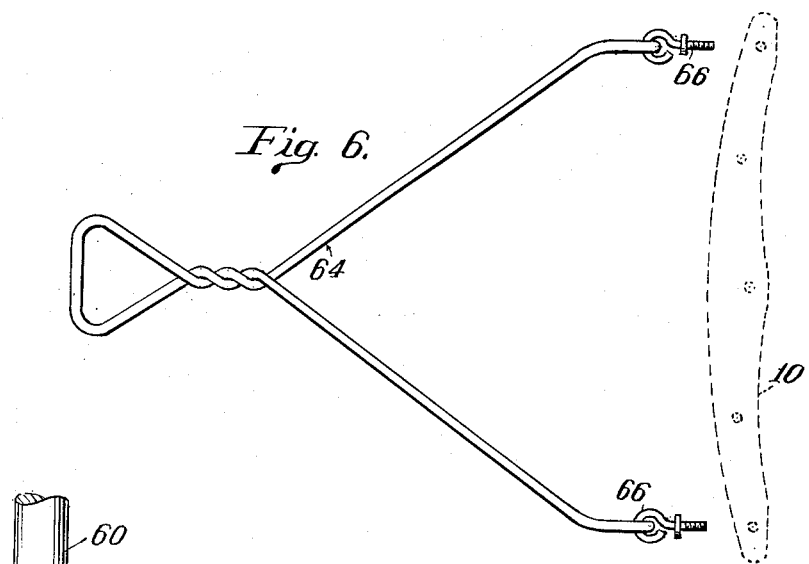
Figure 6 is a plan view of a detail.

For steering by walking, a stirrup or bridle 64, Figure 6, may be connected, as by eye bolts 66, to the steering bar 10, one of the two usual bolts 12 being removed to allow the bar 10 to swing freely.

The mounting for the rear wheels 66 comprises an adjustable frame including rods 68, coupled together by a coupling 70, having right and left threads, like coupling 58, for varying the length of the frame. Rods 68 have small plates 72 welded thereto, carrying hook bolts 74 for securing to the sled runners 2. Rods 68 have axle portions 70, carrying spacer sleeves 74 and the wheels 66.

There has thus been provided an attachment for a sled, whereby it can readily be transformed into an express wagon or coaster, which can be used as such during the non-winter months.

While the preferred construction has been described in detail, it should be understood that the invention is not to be limited to the exact construction shown, but may be carried out in other ways.

I claim as my invention:

1. An attachment for converting a sled having runners to a wheeled vehicle, comprising a substantially rectangular frame adapted to be secured to the runners of the sled, said frame comprising horizontally extending upper and lower webs, each of said webs being made in two parts, means for variably axially positioning the two parts of the webs with respect to each other, for thereby varying the effective length of said frame, thereby forming two open-ended U-shaped frames, each of which is adapted to fit over one of the runners and thereafter to have the respective upper and lower parts of said webs secured together for accommodating runners located at different distances apart, clamps carried by said lower web adapted to be secured to the runners of the sled, an axle rod pivotally mounted near each end of said frame to swing about a vertical axis, said axle rods each comprising a lower horizontally extending axle and an upper horizontally extending control arm interconnected by a vertically extending portion, diagonally extending control rods crossing each other and respectively connected to the inner ends of said control arms and adapted to be connected to a steering bar on the sled, and a wheel mounted on each of said axles.

2. An attachment for converting a sled to a wheeled vehicle as set forth in claim 1, wherein said upper and lower webs have vertically alined apertures near the outer ends thereof adapted to receive said vertical portions of the axle rods for pivotal movement on a vertical axis, whereby steering of the sled may be effected.

3. An attachment for converting a sled to a wheeled vehicle as set forth in claim 1, including means for varying the effective length of the control rods.

ALVA V. MOFFITT.

References Cited in the file of this patent

UNITED STATES PATENTS

| Number | Name | Date |
| --- | --- | --- |
| 1,123,676 | Bule | Jan. 5, 1915 |
| 1,599,223 | Epps | Sept. 7, 1926 |
| 1,637,999 | Killinger | Aug. 2, 1927 |
| 1,866,115 | Larson | July 5, 1932 |
| 2,019,958 | Fluegel | Nov. 5, 1935 |
| 2,193,411 | Sheldon | Mar. 12, 1940 |
| 2,480,235 | Gainsley | Aug. 30, 1949 |